(12) United States Patent
Romanov et al.

(10) Patent No.: US 10,355,599 B2
(45) Date of Patent: Jul. 16, 2019

(54) METHOD FOR GENERATING HIGH PULSE VOLTAGE IN AN INDUCTIVE LOAD

(71) Applicant: Closed-up Joint-Stock Company DRIVE, Novosibirsk (RU)

(72) Inventors: Yuriy I. Romanov, Novosibirsk (RU); Stanislav V. Maletskiy, Novosibirsk (RU)

(73) Assignee: Drive CJSC, Novosibirsk (RU)

( * ) Notice: Subject to any disclaimer, the term of this patent is extended or adjusted under 35 U.S.C. 154(b) by 0 days.

(21) Appl. No.: 16/092,693

(22) PCT Filed: May 4, 2016

(86) PCT No.: PCT/RU2016/000271
§ 371 (c)(1),
(2) Date: Oct. 10, 2018

(87) PCT Pub. No.: WO2017/192058
PCT Pub. Date: Nov. 9, 2017

(65) Prior Publication Data
US 2019/0165682 A1    May 30, 2019

(51) Int. Cl.
*H02M 3/335* (2006.01)
*H02M 1/08* (2006.01)
*H02M 1/34* (2007.01)
*H02M 1/00* (2006.01)
*H02M 1/44* (2007.01)

(52) U.S. Cl.
CPC ......... *H02M 3/33507* (2013.01); *H02M 1/08* (2013.01); *H02M 1/44* (2013.01); *H02M 3/33523* (2013.01); *H02M 2001/0006* (2013.01); *H02M 2001/342* (2013.01)

(58) Field of Classification Search
CPC .......... H02M 1/44; H02M 7/217; H02M 7/48; H02M 7/527; H02M 7/537; H02M 1/08; H02M 2001/342; H02M 2001/0006
USPC ............ 363/21.04, 21.1, 21.11, 21.12, 21.18
See application file for complete search history.

(56) References Cited

U.S. PATENT DOCUMENTS

| | | | | |
|---|---|---|---|---|
| 6,069,803 A * | 5/2000 | Cross | ................ | H02M 3/33569 363/21.14 |
| 6,639,811 B2 * | 10/2003 | Hosotani | ............. | H02M 3/3385 363/19 |
| 7,006,364 B2 * | 2/2006 | Jin | .......................... | H02M 1/08 363/131 |
| 8,488,348 B2 * | 7/2013 | Hong | ................ | H02M 3/33569 363/21.18 |

(Continued)

*Primary Examiner* — Alex Torres-Rivera
(74) *Attorney, Agent, or Firm* — Patentagar PLLC; Alexander Rabinovich

(57) ABSTRACT

A method for generating a high pulse voltage in an inductive load consists in periodically connecting an inductive load to the outputs of a source of high constant voltage using a first controllable switching device, periodically disconnecting and connecting a control circuit of a second controllable switching device using a first controllable switch, and also periodically supplying low voltage from an output of a source of low constant voltage to the control circuit of the second controllable switching device via a second controllable switch, thus eliminating conditions conducive to transient pulsed electromagnetic interference during the generation of a high pulse voltage in an inductive load.

1 Claim, 3 Drawing Sheets

(56) References Cited

U.S. PATENT DOCUMENTS

| | | | | |
|---|---|---|---|---|
| 2002/0067624 A1* | 6/2002 | Nishiyama | ........ | H02M 3/33569 |
| | | | | 363/21.01 |
| 2007/0115699 A1* | 5/2007 | Yang | ................ | H02M 3/33569 |
| | | | | 363/21.03 |
| 2009/0268489 A1* | 10/2009 | Lin | ..................... | H02M 1/34 |
| | | | | 363/50 |
| 2015/0198963 A1* | 7/2015 | Romanov | ............ | H02M 3/156 |
| | | | | 323/312 |
| 2016/0344293 A1* | 11/2016 | Hari | ................ | H02M 3/33507 |
| 2017/0083032 A1* | 3/2017 | Romanov | ................ | G05F 1/56 |
| 2017/0288528 A1* | 10/2017 | McCoy | ................ | H02M 1/36 |

\* cited by examiner

METHOD FOR GENERATING HIGH PULSE VOLTAGE IN AN INDUCTIVE LOAD

BACKGROUND OF THE INVENTION

1. Field of the Invention

The proposed design relates to electrical engineering and can be used for providing high voltage pulse power supply having minimally possible level of electromagnetic interference/noise radiated out to the environment.

2. Description of Related Art

Similar engineering designs have been known in the art, see e.g. D. Makashov "Technology of active damping in DC-DC converters". The essence of the known method of generating high pulse voltage in an inductive load, chosen as an analog, lies in:
  providing high DC voltage and low DC voltage;
  generating a sequence of controlling square pulses having a preset duration of pulses;
  delaying the controlling square pulses having a preset duration of pulses by two different delay elements and applying thus delayed controlling square pulses having a preset duration of pulses to two different inputs of a control circuit;
  generating a second sequence of controlling square pulses using the control circuit and applying same to a control input of a first controlled gate;
  periodically connecting an inductive load to outputs of a high DC voltage source by the first controlled gate to thus obtain high pulse voltage in the inductive load;
  generating a third sequence of controlling square pulses using the control circuit and applying same to a control input of a second controlled gate, thus providing periodic connecting and disconnecting a load of the second controlled gate;
  thereby enabling generating short-term pulse electromagnetic noise.

The proposed design and the above-identified design share the following common features:
  providing high DC voltage and low DC voltage;
  generating a sequence of controlling square pulses having a preset duration of pulses;
  generating a second sequence of controlling square pulses;
  applying controlling square pulses to a control input of a first controlled gate;
  generating a third sequence of controlling square pulses;
  providing periodic connecting and disconnecting a load of the second controlled gate;
  periodically connecting an inductive load to outputs of a high DC voltage source by the first controlled gate;
  providing high pulse voltage in the inductive load having a preset duration of pulses.

Also known has been a design (US patent application 20110305048A1 published Dec. 15, 2011), where a method of providing high pulse voltage in an inductive load is disclosed. It was chosen a closest analog, the prototype, and the essence thereof involves:
  providing high DC voltage and low DC voltage;
  generating a first sequence of controlling square pulses having a preset duration of pulses;
  applying the first sequence of controlling square pulses to a control input of a first controlled gate;
  periodically connecting an inductive load to outputs of a high DC voltage source by the first controlled gate to thus obtain high pulse voltage with a preset duration of pulses in the inductive load; as well as
  generating a second sequence of controlling square pulses having another preset duration of pulses;
  applying the second sequence of controlling pulses to a control input of a first controlled switch;
  periodically disconnecting and connecting by the first controlled switch a line controlling the second controlled gate and a load thereof;
  thereby enabling generating short-term pulse electromagnetic noise.

The proposed design and the above-identified prototype share the following common features:
  providing high DC voltage and low DC voltage;
  generating a first sequence of controlling pulses having a preset duration of pulses;
  applying the first sequence of controlling pulses to a control input of a first controlled gate;
  periodically connecting an inductive load to outputs of a high DC voltage source by the first controlled gate;
  thus obtaining high pulse voltage having a preset duration of pulses in the inductive load; as well as
  generating a second sequence of controlling square pulses having another preset duration of pulses;
  applying the second sequence of controlling pulses to a control input of a first controlled switch; and
  periodically disconnecting and connecting by the first controlled switch a line controlling the second controlled gate and a load thereof.

The effect which is impossible to achieve in any of the above-discussed prior art designs lies in preventing the short-term pulse electromagnetic noise (appearing in them in the process of providing high pulse voltage in an inductive load) from occurring.

The reason for failure to achieve the above-identified effect in the prior art designs is believed to be lack of attention to the problem of reducing the level of short-term pulse electromagnetic noise radiated to the environment.

SUMMARY OF THE INVENTION

With the characteristics of the prior art designs in view, it is possible to conclude that the problem of having means for providing high pulse voltage in an inductive load that ensure minimally possible level of short-term pulse electromagnetic noise radiated to the environment is of current interest.

The effect mentioned above is achieved by proposing a method of generating high pulse voltage in an inductive load, the method comprising:
  providing high DC voltage and low DC voltage;
  generating a first sequence of controlling square pulses having a preset duration of pulses;
  applying the first sequence of controlling square pulses having a preset duration of pulses to a control input of a first controlled gate;
  periodically connecting an inductive load to outputs of a high DC voltage source by the first controlled gate;
  thus obtaining high pulse voltage having a preset duration of pulses in the inductive load; as well as
  generating a second sequence of controlling square pulses having another preset duration of pulses;
  applying the second sequence of controlling pulses to a control input of a first controlled switch;

periodically disconnecting and connecting a control input of a second controlled gate and a load thereof by the first controlled switch;

transforming the first sequence of controlling pulses having a preset duration of pulses into a third sequence of controlling pulses, trailing edges of the pulses of the third sequence leading trailing edges of the pulses of the first sequence by a preset value; and applying the third sequence of controlling pulses to a control input of a second controlled switch periodically applying low voltage from an output of a low voltage source to a control input of the second controlled gate;

whereby preventing, upon generating the high pulse voltage in the inductive load, short-term pulse electromagnetic noise from occurring.

It is in this way that the above-identified effect is attained.

Reviewing the prior art designs showed that none of them comprises the aggregation of features—known and new. It follows from that that the proposed design satisfies the criteria of novelty and inventive step.

BRIEF DESCRIPTION OF DRAWINGS

The proposed method of providing high pulse voltage in an inductive load is illustrated by an ensuing description and drawings, where.

DETAILED DESCRIPTION OF THE INVENTION

Figure 1:
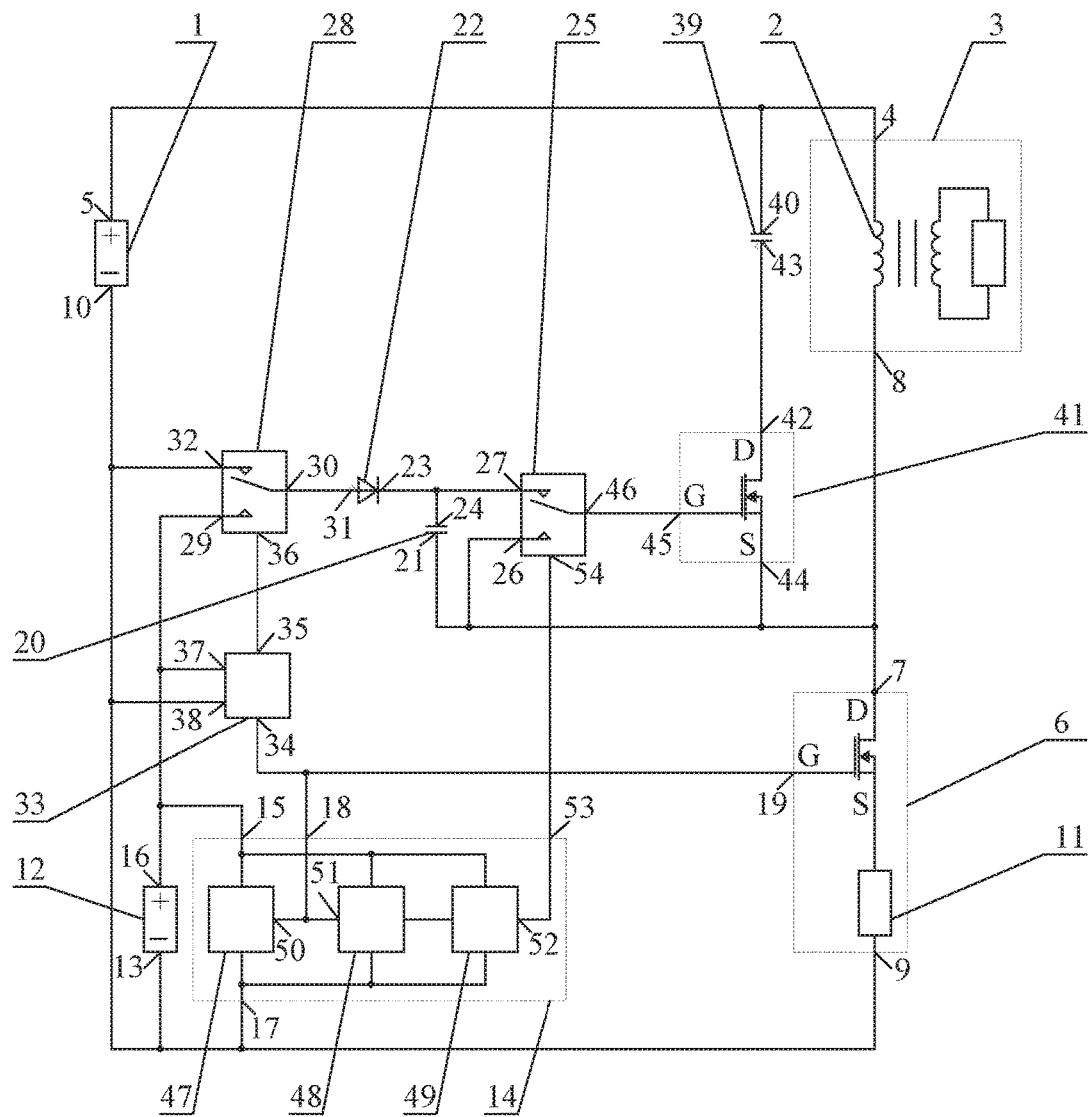
FIG. 1 is a functional scheme of an apparatus for providing high pulse voltage in an inductive load implementing the proposed method.

The apparatus for providing high pulse voltage in an inductive load implementing the proposed method comprises:

a high DC voltage source 1;

an inductive load 2 made as a winding on a magnetic conductor and including a primary winding of a transformer 3 using a ferromagnetic core and a secondary winding connected, for example, to a rectifier, the inductive load 2 being connected via one of terminals thereof (a first one), 4, to a positive terminal 5 of the high DC voltage source 1;

a first controllable gate 6 (including, for example, a MOS transistor) connected by a first terminal 7 thereof (by the drain of the MOS transistor) to another (a second) terminal 8 of the inductive load 2 and connected by a second terminal 9 thereof to a negative terminal 10 of the high DC voltage source 1 (connected between the source of the MOS transistor and a second terminal of the first controlled gate 6 can be a low-ohmic resistor 11 limiting the value of the current flowing through the source of the MOS transistor of the first controlled gate);

a low DC voltage source 12 connected by a negative terminal 13 thereof to the negative terminal 10 of the high DC voltage source 1;

a control circuit 14 connected by a positive power input 15 thereof to a respective (positive) terminal 16 of the low DC voltage source 12, connected by a negative power input 17 thereof to the respective (negative) terminal 13 of the low DC voltage source 12, and connected by a first output 18 thereof to a control input 19 of the first controlled gate 6 (to the gate of the MOS transistor);

a first capacitor 20 connected by one (first) plate 21 thereof to the second terminal 8 of the inductive load;

a diode 22 connected by a cathode 23 thereof to another (second) plate of the first capacitor 20;

a first controlled switch connected by a first input 26 thereof to the first plate 21 of the first capacitor 20 and connected by a second input 27 thereof to the second plate 24 of the first capacitor 20;

a second controlled switch 28 connected by one (first) input 29 thereof to the positive terminal 16 of the low DC voltage source 12, connected by an output 30 thereof to an anode 31 of the diode 22, and connected by a second input 32 thereof to the negative terminal 13 of the low DC voltage source 12;

a first converter 33 of square pulse duration connected by an input 34 thereof to the first output 18 of the control circuit 14, connected by an output 35 thereof to a control input 36 of the second controlled switch 28, and connected by power inputs 37, 38 thereof to the respective terminals 16 and 13 of the low DC voltage source 12;

a second capacitor 39 connected by one (a first) of plates, 40, thereof to the positive terminal 5 of the high DC voltage source 1;

a second controlled gate 41 (including, for example, a MOS transistor) connected by a first (main) terminal 42 thereof (the drain of the MOS transistor) to another (second) plate 43 of the second capacitor 39, connected by a second terminal 44 thereof (the source of the MOS transistor) to the second terminal 8 of the inductive load 2, and connected by a control input 45 thereof to an output 46 of the first controlled switch 25;

the control circuit 14 comprising, for example, connected in series a generator 47 of square pulses, an element 48 of delay of square pulses, and a second converter 49 of square pulse duration, an output 50 of the generator 47 of square pulses connected to an input 51 of the delay element 48 being the first output 18 of the control circuit 14, and an output 52 of the second converter 40 of square pulse duration being a second output 53 of the control circuit 14 connected to a control input 54 of the first controlled switch 25.

Figures 1, 2:
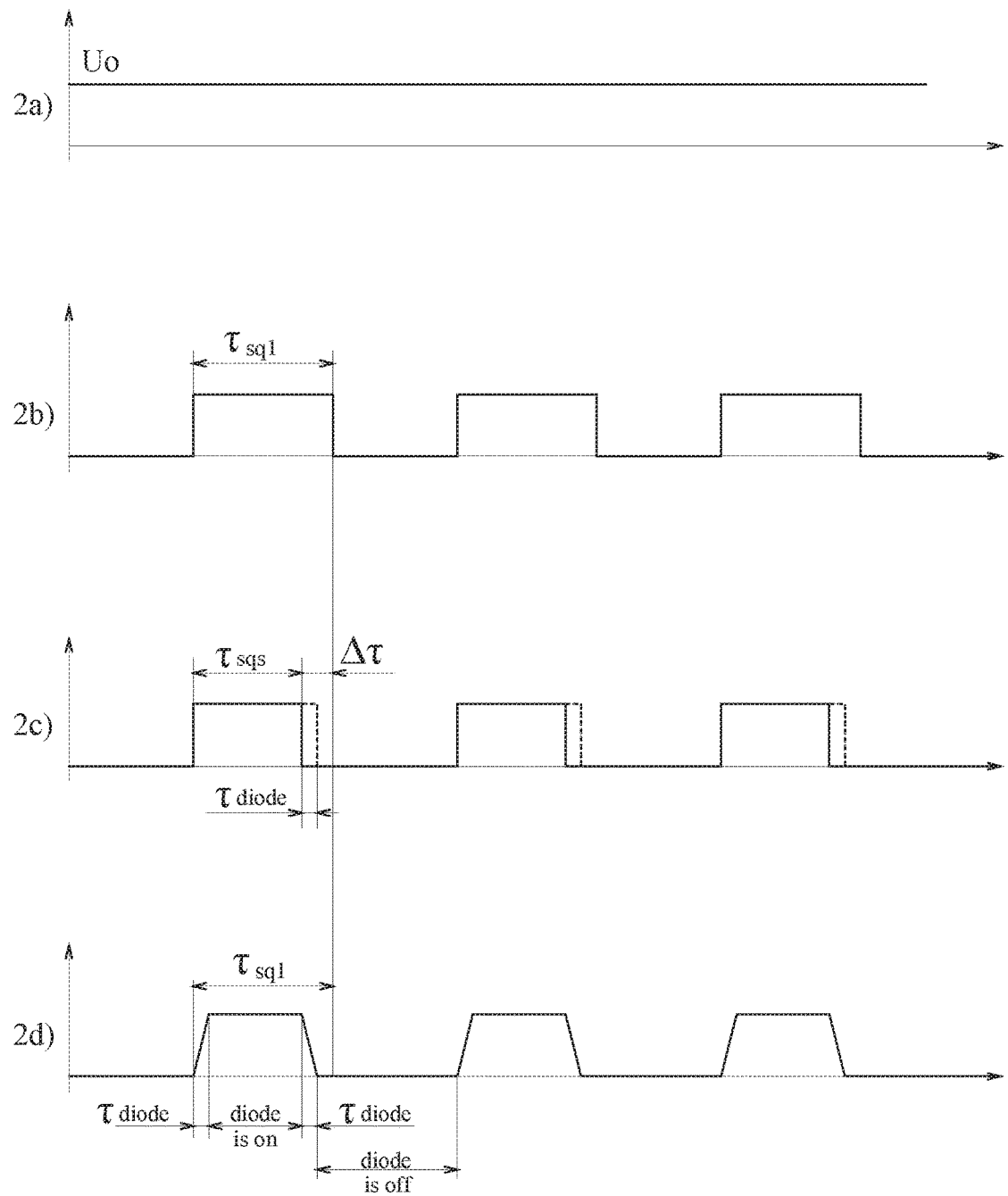
FIG. 2 is flow charts of voltages illustrating the operation of the apparatus.
Figure 2:
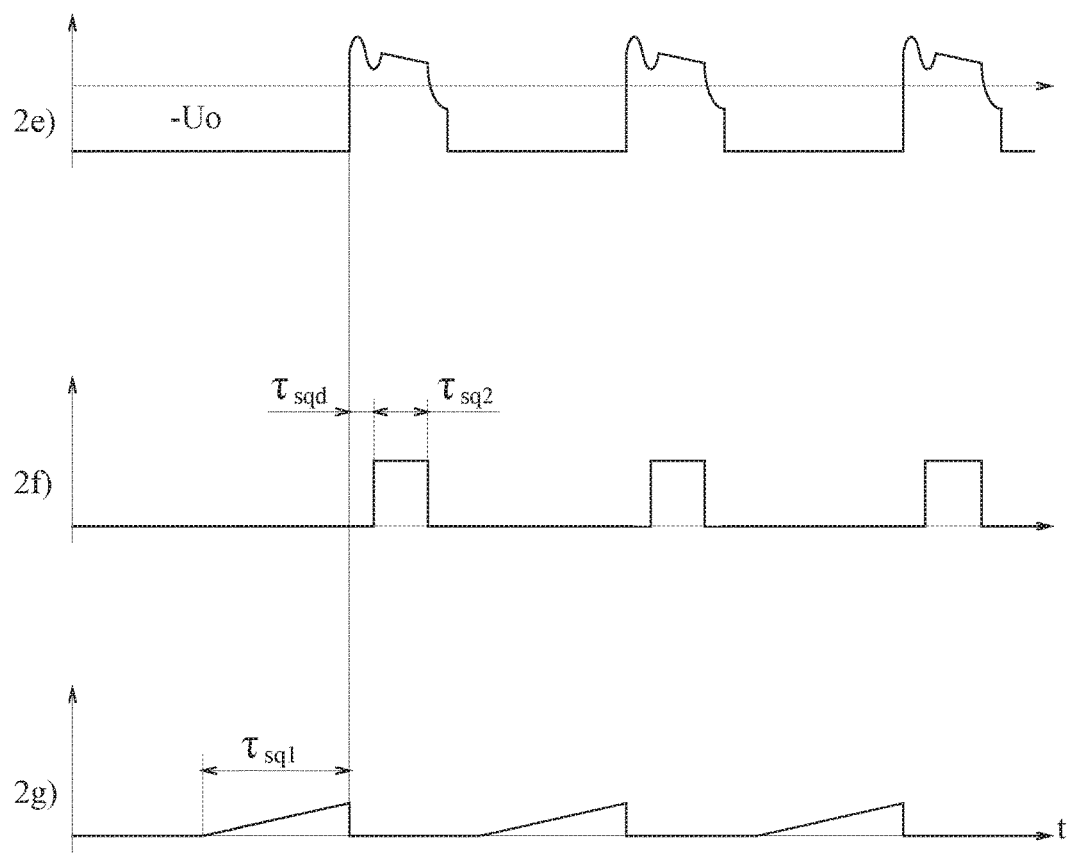

Flow charts of the voltages shown in FIG. 2 and acting in the apparatus implementing the proposed method illustrate:

a) DC voltage $U_0$ of the high DC voltage source 1;

b) control square pulses with a preset duration, $\tau_{sq1}$, at the first output 18 of the control circuit 14;

c) control square pulses with a preset duration, $\tau_{sqs}$, sawtooth pulse voltage at the output 35 of the converter 33 of square pulse duration, $\tau_{sqs} = \tau_{sq1} - \Delta\tau$, where $\Delta\tau > \tau_{diode}$ is a value of a protective time interval securing pre-connecting the anode of the diode 22 to the negative terminal of the low DC voltage source 12;

d) successive conditions of the diode 22: Diode is on, Diode is getting off during $\tau_{diode}$, and Diode is off;

e) high pulse voltage between terminals 8 and 4 at the inductive load 2;

f) control pulses, of the $\tau_{sq2}$ duration, at the second output 53 of the control circuit 14, these control pules being delayed relative the trailing edge of the square control pulses $\tau_{sq1}$ at the first output 18 of the control circuit 14 by the value of $\tau_{sqd}$;

g) saw-tooth pulse voltage at the low-ohmic resistor 11 of the first controlled gate 6 (which voltage reflects variations of current in the inductive load when the square control pulse with the preset duration $\tau_{sq1}$ acts).

The apparatus for providing high pulse voltage in the inductive load, implementing the proposed method, operates as follows.

Square pulses of the duration $\tau_{sq1}$, (see FIG. 2b) come from the output 18 of the control circuit 14 to the control input 19 of the first controlled gate 6 (to the gate of the MOS transistor) and thus open the first controlled gate 6. At that, the potential of the second terminal 8 of the inductive load 2 becomes close to zero relative to the potential of the negative terminal 10 of the high DC voltage source 1 and the negative terminal 13 of the low DC voltage source 12 connected to each other. Thus, the voltage difference between the terminals 8 and 4 of the inductive load 2 becomes close to the value of the output voltage of the high DC voltage source 1, and the inductive load 2 starts building up a high voltage square pulse (relative to the positive terminal 5 of the high DC voltage source 1) which is transformed into the secondary winding of the transformer 3. At the same time, square pulses from the first output 18 of the control circuit 14 come to the control input 34 of the first converter 33 of square pulse duration, which generates at the output 35 thereof a square pulse of the duration of $\tau_{sqs}=\tau_{sq1}-\Delta\tau$ (see the flow chart of FIG. 2c) which comes to the control input 36 of the second (additional) controlled switch 28.

By the action of the above-discussed control pulse, the second controlled switch 28 connects the first input 29 thereof (connected to the positive terminal 16 of the low DC voltage source 12) to the output 30 thereof (connected to the anode 31 of the diode 22). Consequently, current starts flowing from the positive terminal 16 of the low DC voltage source 12 through the second controlled switch 28, opened diode 22, first capacitor 20 and opened first controlled gate 6. This current is charging the first capacitor 20, thus creating voltage on the plates 21 and 24 thereof, the voltage being close by the value thereof to the output voltage of the low DC voltage source 12. After the controlling pulse of the duration $\tau_{sqs}=\tau_{sq1}-\Delta\tau$ ends at the control input 36 of the second controlled switch 28, the switch 28 connects the second input 32 thereof (connected with the negative terminal 13 of the low DC voltage source 12) to the output 30 thereof (connected with the anode of the diode 22).

Accordingly, the diode 22 turns off since applied to the cathode 23 thereof is the voltage between the plates of the first capacitor 20 charged earlier, the voltage being close to the output voltage of the low DC voltage source 12. Because of diode 22 response time, the turning off thereof takes time of $\tau_{diode}$ (see chart 2d in FIG. 2).

If the duration $\tau_{sqs}$ of the control pulse at the output 35 of the square pulse duration converter 33 is such that $\tau_{sq1}-\tau_{sqs}=\Delta\tau>\tau_{diode}$, then the diode 22 will be reliably off by the time of the ending of the control pulse of duration $\tau_{sq1}$ at the output 18 of the control circuit 14 (see charts 2c, d in FIG. 2).

After the square pulse of the duration $\tau_{sq1}$ coming to the control input 19 of the first controlled gate 6 (the gate of the MOS transistor) ends, the first controlled gate 6 turns off, and high voltage equal to the sum of the output voltage of the high DC voltage source 1 and voltage between terminals 8 and 4 of the inductive load 2 appears at the first terminal of the first controlled gate (the drain of the MOS transistor) connected to the terminal 8 of the inductive load 2.

At that moment, the voltage difference between terminals 8 and 4 of the inductive load 2 changes the sign thereof (see chart 2e in FIG. 2) indicating the end of generating high pulse voltage of the negative polarity in the inductive load.

Due to the fact that by this time the diode 22 has been reliably off (see chart 2d in FIG. 2), no pulse current surge happens through the incompletely closed diode 22 in the apparatus for generating high pulse voltage implementing the proposed method—unlike apparatuses which implement prior art methods.

Seen on chart 2g in FIG. 2 can be the pulse voltage at the low-ohmic resistor 11 of the first controlled gate 5 which reflects a change of current in the inductive load 2 during the action of the control square pulse of the preset duration $\tau_{sq1}$. It shows that no short-time power pulse noise, caused in the prior art apparatuses by a surge of a pulse current through the incompletely closed diode 22, occurs at the end of generating high pulse voltage of the negative polarity in the inductive load 2, this resulting in better electromagnetic compatibility.

When the first controlled gate 6 turns off (after the control square pulse of the duration $\tau_{sq1}$ ends), voltage appears essentially instantaneously at the first terminal 7 (the drain of the MOS transistor) thereof from the positive terminal 5 of the high DC voltage source 1 via the inductive load 2. This voltage, equal to the sum of the output voltage of the high DC voltage source 1 and voltage between terminals 8 and 4 of the inductive load 2, is applied to the first plate 21 of the first capacitor 20, which was charged earlier to the voltage equal to the output voltage of the low DC voltage source 12. Consequently, the voltage difference between the first, 26, and second, 27, inputs of the first controlled switch 25 remains approximately equal to the output voltage of the low DC voltage source 12 but shifted (relative to the potential of the negative terminal 10 of the high DC voltage source 1 and the negative terminal 13 of the low DC voltage source 12 connected to each other) by the value equal to the sum of the output voltage of the high DC voltage source 1 and voltage between terminals 8 and 4 of the inductive load 2.

From the output 50 of the square pulse generator 47 of the control circuit 14, square pulses, having passed through the delay element 48 and the square pulse duration converter 49 of the control circuit 14 and having been converted as illustrated in chart 2f in FIG. 2, come to the control input 54 of the first controlled switch 25.

By the action of those pulses of the duration $\tau_{sq2}$, the first controlled switch 25 connects the first input 27 thereof with the output 46 thereof, thus connecting, respectively, the second plate 24 of the first capacitor 20 with the control input 45 of the second controlled gate 41.

As a result of that, the second controlled gate 41 goes open since a potential at the output 46 of the first controlled switch 25 turns out to be higher than the potential of the second terminal 44 (the source of the MOS transistor) of the second controlled gate 41 by the value of voltage between the plates 24 and 21 of the first capacitor 20 (which is close to the output voltage of the low DC voltage source 12). As long as the second controlled gate 41 is on, recharging the second capacitor 39 takes place in the circuit including the first terminal 4 of the inductive load 2, the second capacitor 39, the open second controlled gate 41, and the second terminal 8 of the inductive load 2.

After the control square pulse of the duration $\tau_{sq2}$ at the control input of the first controlled switch 25 ends, the controlled gates 6 and 41 go off (illustrated by charts 2b and 2f in FIG. 2), and dumped vibrations illustrated in chart 2e of FIG. 2 appear in a resonant circuit formed by transformer 3 primary winding leakage inductance and transformer 3 spurious capacitance (not shown). At the moment of minimal value of voltage at the first (main) terminal 7 of the first controlled gate 6 (drain of the MOS transistor), a control square pulse of the duration $\tau_{sq1}$ from the output 18 of the control circuit 14 is again applied to the control input 19 of the first controlled gate 25, and the all the processes repeat themselves.

In this way, the proposed method of generating high pulse voltage in the inductive load allows providing apparatuses advantageously differing from the prior art in lesser level of noise radiated into the environment.

Functional units composing the above-discussed apparatus can be implemented in various ways. The square pulse duration converters 33 and 49 can, for example, be implemented as a monostable multivibrator described, for example, in "The 555 IC Project Book" by Robert J. Traister, TAB Books, 1985 A power component of the controlled switches 7, 41 can include either a MOS transistor or an IGBT or a bipolar transistor or a thyristor, etc. All the other elements of the apparatus are well known in the art and disclosed in numerous publications on pulse technique and radioelectronics.

What is claimed is:

1. A method of generating high pulse voltage in an inductive load, the method comprising:
   providing high DC voltage and low DC voltage;
   generating a first sequence of controlling square pulses having a preset duration of pulses;
   applying the first sequence of controlling square pulses having a preset duration of pulses to a control input of a first controlled gate;
   periodically connecting an inductive load to outputs of a high DC voltage source;
   generating a second sequence of controlling square pulses having another preset duration of pulses;
   applying the second sequence of controlling pulses to a control input of a first controlled switch;
   periodically disconnecting and connecting a control input of a second controlled gate and a load thereof by the first controlled switch;
   transforming the first sequence of controlling pulses having a preset duration of pulses into a third sequence of controlling pulses, trailing edges of the pulses of the third sequence leading trailing edges of the pulses of the first sequence by a preset value; and
   applying the third sequence of controlling pulses to a control input of a second controlled switch periodically applying the low voltage from an output of a low DC voltage source to a control input of the second controlled gate.

* * * * *